United States Patent [19]
Huang et al.

[11] Patent Number: 5,661,646
[45] Date of Patent: Aug. 26, 1997

[54] MULTI-PHASE DC-DC CHOPPER WITH DIFFERENT NUMBER OF PHASES

[75] Inventors: Xianrui Huang, Florence, S.C.; Minfeng Xu, Forest; Paulo F. Ribeiro, Lynchburg, both of Va.

[73] Assignee: The Babcock & Wilcox Company, New Orleans, La.

[21] Appl. No.: 723,158

[22] Filed: Sep. 25, 1996

[51] Int. Cl.$^6$ .................................................. H02M 3/10
[52] U.S. Cl. .............................. 363/124; 363/14; 323/360
[58] Field of Search .............................. 323/360; 363/14, 363/124

[56] References Cited

U.S. PATENT DOCUMENTS

| | | | |
|---|---|---|---|
| 3,088,040 | 4/1963 | Newhouse | 307/88.5 |
| 3,588,664 | 6/1971 | Akamatsu | 321/2 |
| 4,384,321 | 5/1983 | Rippel | 363/124 |
| 4,464,617 | 8/1984 | Yantovsky et al. | 318/717 |
| 4,748,397 | 5/1988 | Ogawa et al. | 323/222 |
| 5,111,378 | 5/1992 | Nowak et al. | 363/98 |
| 5,181,170 | 1/1993 | Huang et al. | 363/21 |
| 5,204,548 | 4/1993 | Dahler et al. | 307/66 |

OTHER PUBLICATIONS

T.H. Barton, "The Polyphase Chapter–A Symmetrical Component Analysis", IEEE Trans on Industry Applications, vol. IA–16, No. 2, Mar. 1980.

B.D. Hassan, et al., "400 MWSMES Power Conditioning System Development and Simulation," IEEE Trans. on Power Electronics, vol. 8, No. 5, Jul. 1993.

R.H. Lasseter, "Power Conditioning Systems for Superconductive Magnetic Energy Storage," IEEE Trans on Energy Conversion, vol. 6, No. 3, Sep. 1991.

T. Ise, J.J. Skiles, "Circuit Configuration of GTO Converter For Superconducting Magnetic Energy Storage," Apr. 1988 Pesc '88 Record.

*Primary Examiner*—Jeffrey L. Sterrett
*Attorney, Agent, or Firm*—Robert P. Bennett, Jr.; Robert J. Edwards

[57] ABSTRACT

A multi-phase DC chopper circuit having a different number of phases on each side of the current source. The ciruit utilizes fewer chopper phases and produces more discrete DC voltage steps.

9 Claims, 2 Drawing Sheets

MULTI-PHASE DC-DC CHOPPER WITH DIFFERENT NUMBER OF PHASES

BACKGROUND OF THE INVENTION

1. Field of the Invention

The invention relates to a new and useful DC chopper circuit for use with electrical energy storage systems. More specifically, it is a new type of DC chopper circuit useful for eliminating harmonic voltages across a current source in a superconducting magnetic energy storage system.

2. Description of the Related Art

Multi-phase DC chopper circuits typically are connected in parallel between a voltage source and a current source. Each phase of the chopper has a pair of switches and a small inductor. By selectively switching the switches on and off, the current source or voltage source may be regulated, depending on the application.

DC chopper circuits with equal numbers of phases on each side of the current source are known in the art.

Examples of known multi-phase choppers having an equal number of phases on each side of the current source are found in the following patents.

U.S. Pat. No. 3,588,664 to Akamatsu teaches a DC chopper circuit with equal phases.

U.S. Pat. No. 4,748,397 to Ogawa et al. discloses an equal phase DC chopper utilizing a current controller.

Huang, U.S. Pat. No. 5,181,170, is for a DC converter type of DC chopper which uses alternate switches, wherein one side of the chopper is on when the other side phases are off. This patent also utilizes an equal number of phases on each side of the chopper circuit.

And U.S. Pat. No. 5,111,378 to Nowak et al., discloses a standard DC chopper utilizing duty switches to control each phase.

U.S. Pat. No. 3,088,040 to Newhouse discloses a super conductor switch that is essentially a multi-phase DC chopper with equal phases on each side of the chopper.

U.S. Pat. No. 4,464,617 to Yantovsky et al., discloses a multi-phase machine which uses a DC chopper type circuit having equal size phases to control it.

Dähler et al., U.S. Pat. No. 5,204,548, teaches a storage circuit utilizing a conventional DC chopper transfer energy.

A known type of multi-phase chopper consists of p single-phase switch choppers (switches), such as gate turn off (GTO), Insulated Gate Bipolar Transistor (IGBT), or other devices, connected in parallel between a current source (CS), such as a Superconducting Magnetic Energy Storage (SMES) magnet, and a voltage source (VS), such as a capacitor. Each single-phase chopper has a pair of switches and small inductors. When a multi-phase chopper operates at high frequencies, it acts as a voltage divider that reduces the voltage across the current source (CS) to a fraction of the voltage source (VS) voltage. If a p-phase chopper operates only at the discrete duty cycles (d=fraction of switch ON time) of 0/p, 1/p, . . . , p/p, harmonic voltages across current source (CS) can be eliminated. This is important for a device like superconducting magnetic energy storage (SMES) where harmonic voltages generate large AC losses and possibly induce large dynamic voltages inside the coil.

The number of discrete DC steps which can be obtained using a DC chopper with equal phases on each side is determined as follows.

If a p-phase chopper operates at the duty cycle of d=n/p (n=0, 1, 2, . . . p), the voltage across the current (CS) source is:

$$V_{CS} = \alpha V_{VS}, \quad \alpha = (2d-1).$$

and the chopper current is:

$$I_{VS} = \alpha I_{CS}$$

Also, it should be noted that:

$$\text{VS Power} = V_{VS} \cdot I_{VS} = \alpha V_{VS} I_{CS} = V_{CS} \cdot I_{CS} = \text{CS Power}$$

This mode of operation, where both sides are switching between ON and OFF, allows p+1 DC voltage steps:

$$\alpha = -1, \frac{2-p}{p}, \frac{4-p}{p}, \ldots, 1$$

Two other modes of operation have been proposed. One side of the chopper is either always OFF ($d_1=0$) or ON ($d_1=1$) while the other side operates at $d_2=n/p(n=0, 1, 2, \ldots p)$:

one side is OFF:

$$\alpha = d - 1 = -1, \frac{1-p}{p}, \frac{2-p}{p}, \ldots, 0,$$

one side is ON:

$$\alpha = d = 0, \frac{1}{p}, \frac{2}{p}, \ldots, 1$$

All three operations can yield 2p+1 discrete DC steps:

$$\alpha = \frac{+n}{P}, \quad n = 0, 1, 2, \ldots, p$$

SUMMARY OF THE INVENTION

It is a primary object of the present invention to increase the number of discrete DC steps which can be obtained from a multi-phase chopper without increasing the number of phases utilized at each side of the chopper.

Accordingly, a multi-phase DC chopper having a different number of single phase switch choppers on each side of the circuit is provided. The circuit of the present invention is similar to a typical DC chopper circuit, with the exception that the number of phases on each side of the current source is different. The phases are capable of operating independently of each other and as a result produce many more DC steps than a DC chopper having an equal number of phases placed on each side of the current source.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

DESCRIPTION OF THE PREFERRED EMBODIMENTS

Figure 1:
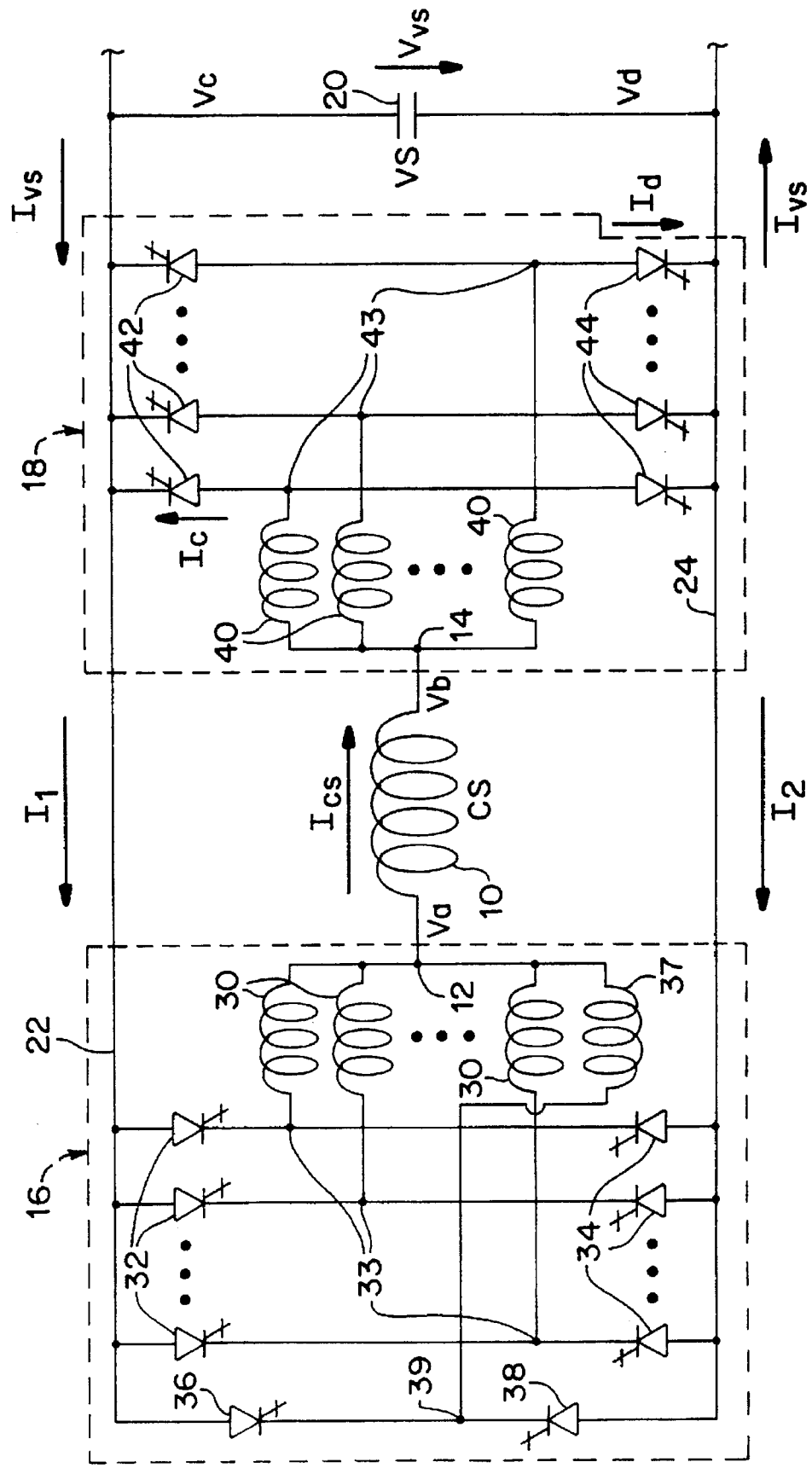
FIGS 1 and 2 are schematic drawings of the circuit of the invention.

In the drawing a DC chopper circuit of the present invention is shown.

Voltage source 20 is placed in parallel with side A phases 16 and side B phases 18. I1 current bus 22 connects to one terminal of voltage source 20 and one side of side A phases 16 and side B phases 18. I2 current bus 24 connects the second terminal of voltage source 20 and the other terminals of side A phases 16 and side B phases 18. Current source 10 is connected between side A phases 16 and side B phases 18.

Side A phases 16 are comprised of side A first switches 32 and side A second switches 34. Side A first switches 32 and side A second switches 34 are connected such that their reverse direction terminals are connected together at node 33, while their forward direction terminals are connected to I1 current bus 22 and I2 current bus 24 respectively. Side A inductors 30 are connected to current source 10 at side A current source node 12 and node 33, between first switches 32 and second switches 34. One inductor 30 is placed between nodes 33 of each pair of switches 32 and 34 and current source node 12.

Side B phases have first switches 42 and second switches 44 connected in series between I1 current bus 22 and I2 current bus 24. The side B switches 42 and 44 are connected with their positive direction terminals connected together at nodes 43 and their reverse direction terminals connected to current buses 22 and 24, respectively. Inductors 40 are connected between node 43 between switches 42, 44 and side B current source node 14 at the second terminal of current source 10.

Side A phases 16 have an additional phase of first switch 36 and second switch 38 having their forward direction terminals connected together at node 39 connected in series between I1 current bus 22 and I2 current bus 24. inductor 37 is connected between node 39 and bus 12 of current source 10. Thus, side A 16 has more phases than side B 18.

Although side A 16 is shown having only one additional phase, it is not intended to be limiting on the scope of the invention. Any multi-phase DC chopper circuit having more phases on one side than the other is within the scope of this invention.

The circuit of the present invention is based on the fact that the operation on one side of the chopper is independent of the other side. The present invention uses a different number of phases on the two sides of the chopper circuit and allows the two sides to operate independently at different duty cycles. If $p_A$ and $p_B$ are the number of phases of side A 16 and side B 18, and the duty cycle of side A 16 is $d_A = n_A/p_A (n_A = 0, 1, 2, \ldots, p_A)$ and the duty cycle of side B 18 is $d_B = n_B/p_B (n_B = 0, 1, 2, \ldots, p_B)$ the relationship between the current source 10 voltage and the voltage source 20 voltage is:

$$V_{CS} = \alpha V_{VS},\ I_{VS} = \alpha I_{CS},\ \alpha = (d_A + d_B - 1)$$

There are $(p_A+1) \times (p_B+1)$ different combinations of $(d_A, d_B)$ that produce a series of DC steps $\alpha = (d_A + d_B - 1)$. If $p_A = p_B$, many combinations will yield the same values of $\alpha$. For example, a conventional 12-phase chopper system ($p_A = p_B = 12$) has $13 \times 13 = 169$ combinations of $(d_A, d_B)$, but they yield only 25 different DC steps:

$$\alpha = \pm \frac{n}{12},\ n = 0, 1, 2, \ldots, 12,$$

and the minimum non-zero DC step is $\pm 1/12$.

If $p_A \neq p_B$, as with the circuit of the present invention, we can have very different sets of $d_A$ and $d_B$. This yields many more DC steps. For example, if $p_A = 6$, $p_B = 7$, the number of combinations of $(d_A, d_B)$ is reduced to 56, but they yield 55 different values of DC steps:

$$\alpha = \pm \frac{n}{42},$$

n=0, 1, 2, 3, 4, 5, 6, 7, 8, 9, 10, 11, 12, 14, 15, 16, 17, 18, 21, 22, 23, 24, 28, 29, 30, 35, 36, 42, and the minimum non-zero step is $\pm 1/42$. Thus, by using a chopper circuit in which the number of side A phases 16 is different from the number of side B phases 18, the number of choppers can be nearly halved (from 24 to 13) while the number of DC steps is more than doubled (from 25 to 55).

Figure 2:
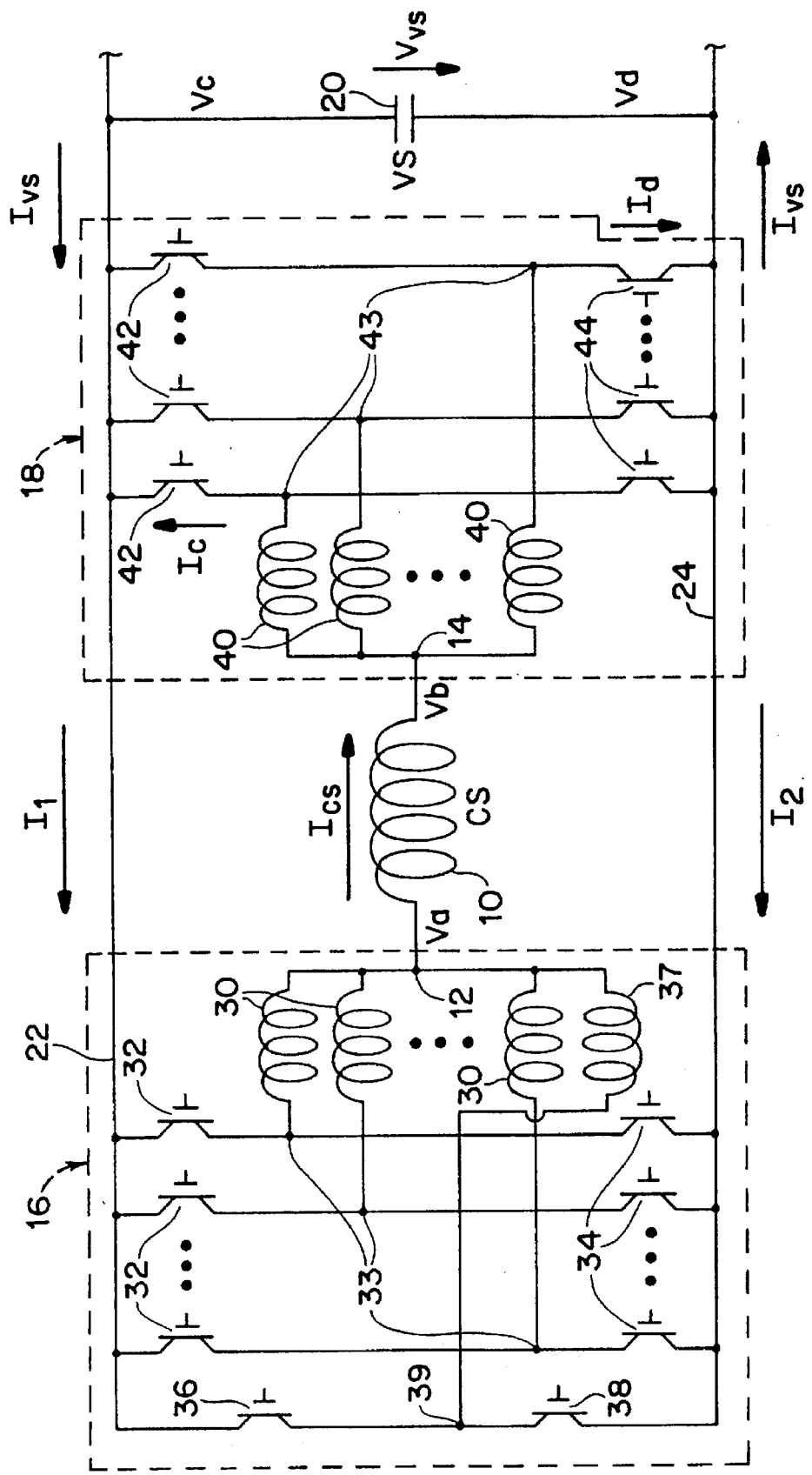

Switches 32, 34, 42 and 44 maybe of any known type of switch which is capable of operating rapidly enough for the application which the circuit is utilized. For example, the switches, as shown in FIGS. 1 and 2, could be gate turn-off, insulated gate bipolar transistors, metal-oxide semiconductor (MOS) controlled thyristors, MOS turn-off or another type of switch. Inductors 30 and 40 have values which are smaller than those of the current source 10 and may also be of any known value with that limitation. Voltage source 20 may be a capacitor or some other device capable of holding a charge. Current source 10 maybe a superconductor energy storage magnet or similar type of device.

While a specific embodiment of the invention has been shown and described in detail to illustrate the application of the principles of the invention, it will be understood that the invention may be embodied otherwise without departing from such principles.

What is claimed is:

1. A multiphase DC chopper circuit comprising:

a voltage source having a positive and a negative terminal;

a first plurality of chopper phases connected in parallel between the positive terminal and the negative terminal;

a second plurality of chopper phases connected in parallel between the positive terminal and the negative terminal, there being more chopper phases in the second plurality than the first plurality; and a current source connected between the first plurality of chopper phases and the second plurality of chopper phases.

2. A circuit according to claim 1, wherein each of the chopper phases comprises:

a pair of semiconductor switches, each having a forward direction terminal and a reverse direction terminal, the switches connected in series and having their like terminals connected together at a node; and an inductor connected between the node and the current source.

3. A circuit according to claim 2, wherein the semiconductor switches comprise one of insulated gate bipolar transistors, gate turn-off switches, metal-oxide semiconductor controlled thyristors or metal-oxide semiconductor turn-off switches.

4. A circuit according to claim 3, wherein the semiconductor switches are insulated gate bipolar transistors.

5. A circuit according to claim 3, wherein the semiconductor switches are gate turn off switches.

6. A circuit according to claim 3, wherein the semiconductor switches are metal-oxide semiconductor controlled thyristors.

7. A circuit according to claim 3, wherein the semiconductor switches are metal-oxide semiconductor turnoff switches.

8. A circuit according to claim 3, wherein the second plurality of phases comprises at least one more phase than the first plurality of phases.

9. A circuit according to claim 2, wherein the second plurality of phases comprises at least one more phase than the first plurality of phases.

* * * * *